US005712536A

United States Patent [19]

Haas et al.

[11] Patent Number: 5,712,536

[45] Date of Patent: Jan. 27, 1998

[54] REDUCED BUS VOLTAGE INTEGRATED BOOST HIGH POWER FACTOR CIRCUIT

[75] Inventors: Kurt W. Haas, Chesterland; David J. Kachmarik, North Olmsted; Kelvin B. Belle, Willoughby Hills, all of Ohio

[73] Assignee: General Electric Company, Schenectady, N.Y.

[21] Appl. No.: 509,281

[22] Filed: Jul. 31, 1995

[51] Int. Cl.[6] .............................. H02M 5/458; G05F 1/70

[52] U.S. Cl. .............................. 315/247; 315/DIG. 7; 315/219; 315/209 R; 363/132; 363/37; 323/222

[58] Field of Search .............................. 315/247, 219, 315/DIG. 7, 209 R; 363/37, 132; 323/222

[56] References Cited

U.S. PATENT DOCUMENTS

| | | | |
|---|---|---|---|
| 3,754,160 | 8/1973 | Jensen | 315/97 |
| 5,408,403 | 4/1995 | Nerone et al. | 363/37 |

*Primary Examiner*—Robert Pascal
*Assistant Examiner*—Arnold Kinkead
*Attorney, Agent, or Firm*—George E. Hawranko

[57] ABSTRACT

A condensed power supply circuit for powering a gas discharge lamp with bi-directional current reduces duty cycle by increasing dead time. The circuit comprises an arrangement for supplying d.c. power from an a.c. voltage, a series half bridge converter, a boost converter, a resistor-capacitor delay circuit associated with a gate to control dead time, and a snubber capacitance for facilitating zero voltage switching to fill the entire dead time. The series half-bridge converter alternately impresses a d.c. bus voltage from a bus conductor across a load circuit first with one polarity and then with an opposite polarity. The series half-bridge converter includes a first switch, a second switch, and a switching control circuit for alternately switching on the first and second switches. The boost converter comprises a boost capacitor, a boost inductor, and means for periodically connecting a load end of the boost inductor through a low impedance path to the ground conductor, thereby charging the boost inductor. The present invention reduces duty cycle via an increase in dead time. The resistor-capacitor delay circuit, associated with a gate, is used to control dead time. The snubber capacitance, which facilitates zero voltage switching to fill the entire dead time range, has a value set by the resistor-capacitor delay circuit.

18 Claims, 4 Drawing Sheets

REDUCED BUS VOLTAGE INTEGRATED BOOST HIGH POWER FACTOR CIRCUIT

TECHNICAL FIELD

The present invention relates generically power factor corrected compact fluorescent lamps and, more particularly, to bus voltage control of an integrated boost converter high power factor compact fluorescent ballast.

BACKGROUND ART

A prior art circuit for supplying a load with bi-directional current includes a series half-bridge converter comprising a pair of series-connected switches which are alternately switched on to achieve bi-directional current flow through the load.

In order to improve the power factor of the load, the prior art power supply circuit incorporates a boost converter which receives rectified, or d.c., voltage from a full-wave rectifier, which, in turn, is supplied with a.c. voltage and current. The boost converter generates a voltage boosted above the input d.c. voltage on a capacitor of the boost converter ("the boost capacitor"), which supplies the d.c. bus voltage for powering the mentioned series half-bridge converter. The prior art boost converter includes a dedicated switch ("the boost switch") which repetitively connects an inductor of the boost converter ("the boost inductor") to ground and thereby causes current flow in the inductor, and hence energy storage in such inductor. The energy stored in the boost inductor is then directed to the boost capacitor, to maintain a desired bus voltage on such capacitor.

In the operation of the prior art boost converter, the energy stored in the boost inductor is completely discharged into the boost capacitor prior to the boost switch again connecting the boost inductor to ground. Operation of the boost converter as described, i.e. with complete energy discharge of the boost inductor, is known as operation in the discontinuous mode of energy storage. Prior art circuits may also operate in the continuous mode of energy storage, wherein the inductor is not allowed to fully discharge. This allows the circuit to keep some stored energy.

One drawback of prior art circuits is that the overall gain typically has a wide variation, especially when powering such loads as a fluorescent lamp whose loading varies considerably in normal operation. In an effort to maintain a crest factor below about 1.7 and reduce fatigue on a fluorescent lamp load, a power supply circuit with a power factor correction is disclosed in U.S. Pat. No. 5,408,403. The '403 patent, the disclosure of which is totally incorporated herein by reference, provides an integrated boost circuit for powering a load with bi-directional current and providing a high degree of power factor correction.

Unfortunately, in the '403 patent, the bus voltage is approximately twice the peak of the input voltage. For 120V ballast at high line this would be 373V. If this ballast is used in an application that requires a different nominal line, such as, for example, in Mexico or Saudi Arabia (127V); Japan (200V); Europe (230V); United Kingdom or Australia (240V), the peak voltage on the bus would approach or exceed the breakdown voltage of several of the components used in the ballast. Replacing those components with similar components having a higher voltage rating can add significant cost to the circuit, which is undesirable.

It is therefore highly desirable and an object of the present invention to provide a reduced bus voltage integrated boost high power factor circuit for a compact fluorescent lamp. It would also be very desirable to provide such circuit as would be applicable to 120V line voltage applications as well as the mentioned higher line voltage situations.

SUMMARY OF THE INVENTION

In accordance with the present invention, the bus voltage is controlled. Knowing that the bus voltage decreases as the gain decreases, the following mathematical equations are considered. In the continuous mode, the gain ($Gain_{CM}$)of the boost converter, i.e. the ratio of the bus voltage $V_B$ to the input voltage $V_{IN}$, varies as follows:

$$Gain_{CM}=1/(1-D) \quad (1)$$

where D is the ratio of on-time of boost switch $S_B$ to the repetition period $T_S$ of the boost switch. In the discontinuous mode, the boost converter has a gain ($Gain_{DCM}$) as follows:

$$Gain_{DCM}=(1+\sqrt{1+2D^2RT_S/L_B})/2 \quad (2)$$

where D is duty cycle; $L_B$ is boost inductance; R is the overall load across the boost converter; and $T_S$ is the switching repetition period for $S_B$.

The common element in both of the above gain equations, which gain directly affects the bus voltage, is the duty cycle, D. Since dead time ($T_D$), that is, the time when both power switches are off, is inherently related to duty cycle, manipulating the dead time directly affects the bus voltage.

The present invention controls the bus voltage by increasing the dead time. The dead time is controlled by sizing a gate delay circuit, comprising an RC time constant in each FET gate. A snubber capacitor is sized to fully fill the dead time. When one switch is turned off, the normal action (i.e., zero voltage switching) of the resonant converter slowly changes the voltage between the two switches from one rail to another. The time required to accomplish this is a function of the current in a resonant inductor and the amount of capacitance across the two power switches. This capacitance is made up of the output capcitance of the switches in parallel with the snubber capacitance.

BRIEF DESCRIPTION OF THE DRAWINGS

In the following detailed description, reference will be made to the attached drawings in which.

DETAILED DESCRIPTION OF THE PREFERRED EMBODIMENTS

Figure 1:
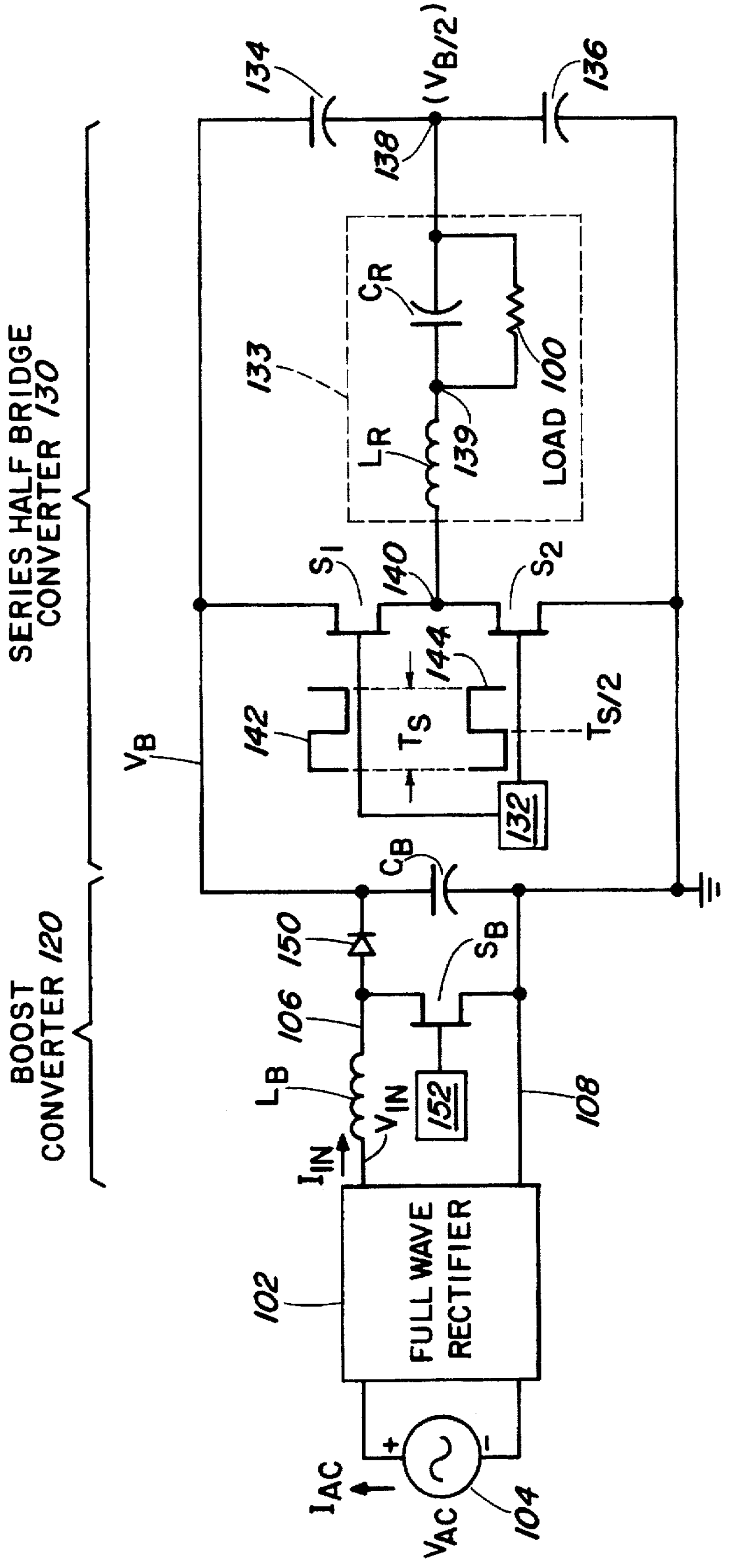
Fig. 1 (PRIOR ART)
FIG. 1 is a simplified schematic of a prior art circuit for powering a load with bi-directional current.

It is to be understood that in the following description, like reference numerals designate like or corresponding elements throughout the several figures.

To introduce concepts that will assist in understanding the present invention, the prior art circuit of FIG. 1 is first described. FIG. 1 shows a simplified schematic of a prior art power supply circuit for a load 100, such as a low pressure discharge lamp, e.g., a fluorescent lamp. The prior art power supply circuit uses a full wave rectifier 102 to rectify a.c. voltage $V_{AC}$ supplied from a source 104, to thereby provide a rectified, or d.c., voltage on conductor 106 with respect to a ground, or reference-voltage, conductor 108. A boost converter 120 of known construction then provides a bus voltage $V_B$ on the upper terminal of a boost capacitor $C_B$. The bus voltage $V_B$ is boosted above the d.c. voltage $V_{IN}$ input to the boost converter, as explained below.

The boosted bus voltage $V_B$ is then applied to the upper switch $S_1$ of a series half-bridge converter 130. Upper switch $S_1$ is alternately switched with lower switch $S_2$, by a switch control circuit 132, to provide bi-directional current flow through a load circuit such as a resonant circuit 133. Resonant circuit 133 includes a load 100, which is shown by way of illustration as a resistive load characterizing a fluorescent lamp. Load 100 is connected between a node 138 to its right and a node 139 to its left. A resonant capacitor $C_R$ is connected in parallel with load 100, and a resonant inductor $L_R$ is connected between node 139 to its right and a node 140 to its left, so as to be in series with resonant capacitor $C_R$. Capacitors 134 and 136 maintain the voltage at their common node 138 at one-half the bus voltage, or $V_B/2$.

To provide bi-directional current to resonant circuit 133, switch $S_1$ is momentarily turned on (i.e., made to conduct) and switch $S_2$ turned off, so that the voltage $V_B/2$ (i.e. $V_B-V_B/2$ on node 138) is impressed across resonant circuit 133 from a node 140 on its left to a node 138 on its right. Then, switch $S_2$ is momentarily turned on and switch $S_1$ off, so that a voltage of $-V_B/2$ (or $0-V_B/2$ on node 138) is impressed across resonant circuit 133 from node 140 to node 138.

Switch control circuit 132 provides switch signals such as shown at 142 and 144 for controlling switches $S_1$ and $S_2$, respectively. As mentioned, switches $S_1$ and $S_2$ are alternately switched; that is, with switch signal 142 in a high state, switch signal 144 is in a low state, and vice versa. Typically, switch signals 142 and 144 alternate at one-half of the illustrated switching repetition period $T_S$ of the switch signals, or at $T_S/2$.

Referring to boost converter 120, it was explained above that the bus voltage $V_B$ constitutes the voltage on boost capacitor $C_B$ and results from charge provided from a boost inductor $L_B$, through a one-way valve 150, such as p-n diode. Boost inductor $L_B$, in turn, is repeatedly energized through the intermittent switching action of a boost switch $S_B$, which is controlled by a switch control circuit 152. When switch $S_B$ is turned on, the input current $I_{IN}$ to boost conductor $L_B$ increases in a generally linear fashion until switch $S_B$, under control of circuit 152, turns off. The energy in boost inductor $L_B$ is then discharged into boost capacitor $C_B$ through one-way valve 150. During discharge of boost inductor $L_B$, a positive voltage from left to right across inductor $L_B$ augments the input voltage $V_{IN}$, to thereby produce a boosted bus voltage $V_B$ on the upper terminal of boost capacitor $C_B$.

Figure 2:
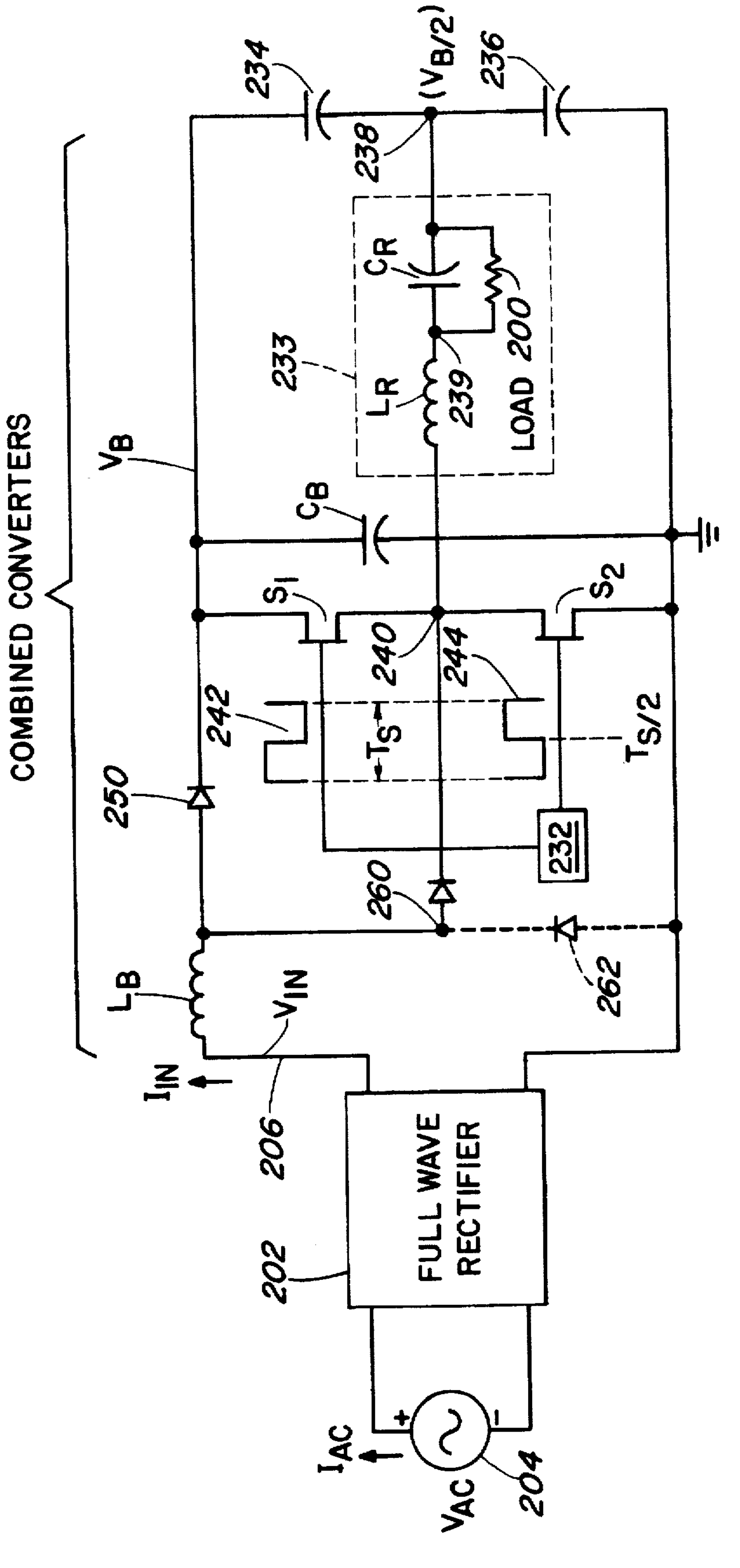
Fig. 2 (PRIOR ART)
FIG. 2 is a simplified schematic of a prior art condensed circuit for powering a circuit with bi-directional current.

Referring now to FIG. 2, there is provided a prior art power supply circuit that also realizes, in addition to the foregoing benefits of the prior art circuit of FIG. 1, benefits including a reduced number of circuit components, which condenses the circuit size, and is particularly desirable for achieving compactness in a fluorescent lamp; and an increase in efficiency by eliminating the hard switched boost switch.

In FIG. 2, parts similar to those described in connection with FIG. 1 share like references numerals; only the first digit of the reference numeral, relating to figure number, is different.

FIG. 2 may contain a series half-bridge converter having parts similar to those in the series half-bridge converter 130 of prior art FIG. 1. However, the configuration of a boost converter in FIG. 2 and its interaction with the series half-bridge converter in FIG. 2 differs from the prior art FIG. 1 arrangement.

In FIG. 2, energy transfer from boost inductor $L_B$ to boost capacitor $C_B$ occurs through one-way valve 250, corresponding to one-way valve 150 in FIG. 1. The charging path for boost conductor $L_B$ of FIG. 2, however, is markedly different from the corresponding charging path in FIG. 1 that includes boost switch $S_B$ connected from the "load" side of inductor $L_B$ to ground. Rather, in FIG. 2, the charging path for boost inductor $L_B$ includes the lower switch $S_2$ of a series half-bridge converter, which switch $S_2$ consequently serves dual purposes. When switch $S_2$ is on (i.e. conducting), charging current from boost conductor $L_B$ flows through such switch via one-way valve 260, such as a p-n diode. A further one-way valve 262, such as a p-n diode, may be connected with its anode grounded and its cathode connected to the "load" side of boost conductor $L_B$. One-way valve 262 serves as a precaution to minimize parasitic voltage caused by a resonant interaction between boost inductor $L_B$ and a parasitic capacitance (not shown) between the output electrodes of switch $S_2$.

Since boost switch $S_B$ in FIG. 2 lacks an independent switch control circuit, such as circuit 152 in FIG. 1, the boost converter operates under the typically more limited control of a switch control circuit 232 for switch $S_2$ (as well as switch $S_1$). Such circuit 232 typically provides a ratio of switch on time to a constant switching repetition period of about 0.5. This allows for a simplified power supply circuit in contrast to FIG. 1, which typically uses a complex switch control circuit 152 providing an adjustable ratio of switch on time to switching repetition period for boost switch $S_B$.

For cost considerations, control circuit 232 is preferably of the self-oscillating type, wherein the switching repetition period of bridge switches $S_1$ and $S_2$ is determined by the resonant frequency of resonant circuit 233, and is constant. Switch control circuit 232 turns switch $S_2$ on for half the switching period $T_S$, or $T_S/2$.

The bus voltage in the circuit of FIG. 2 is approximately twice the peak of the input voltage. For 120V ballast at high line this would be 373V. However, if this ballast is used in an application that requires a different nominal line, such as, for example, in Mexico or Saudi Arabia (127V); Japan (200V); Europe (230V); the United Kingdom or Australia (240K), the peak voltage on the bus would approach or exceed the breakdown voltage of several of the components used in the ballast. It is desirable to maintain the bus voltage within a range of approximately 300 to 360$V_{DC}$ in applications with nominal voltages exceeding 120V.

The present invention therefore provides a reduced bus voltage integrated boost high power factor circuit for a compact fluorescent lamp. Knowing that the bus voltage decreases as the gain decreases, the common element in both the continuous and discontinuous gain equations is the duty cycle, D. Since dead time is inherently related to duty cycle, manipulating the dead time directly affects the bus voltage. Therefore, the present invention controls bus voltage by increasing the dead time. It will be obvious to those skilled in the art that the reduction of duty cycle via an increase in dead time can be accomplished in a variety of ways, without departing from the scope of the present invention.

Figure 3:
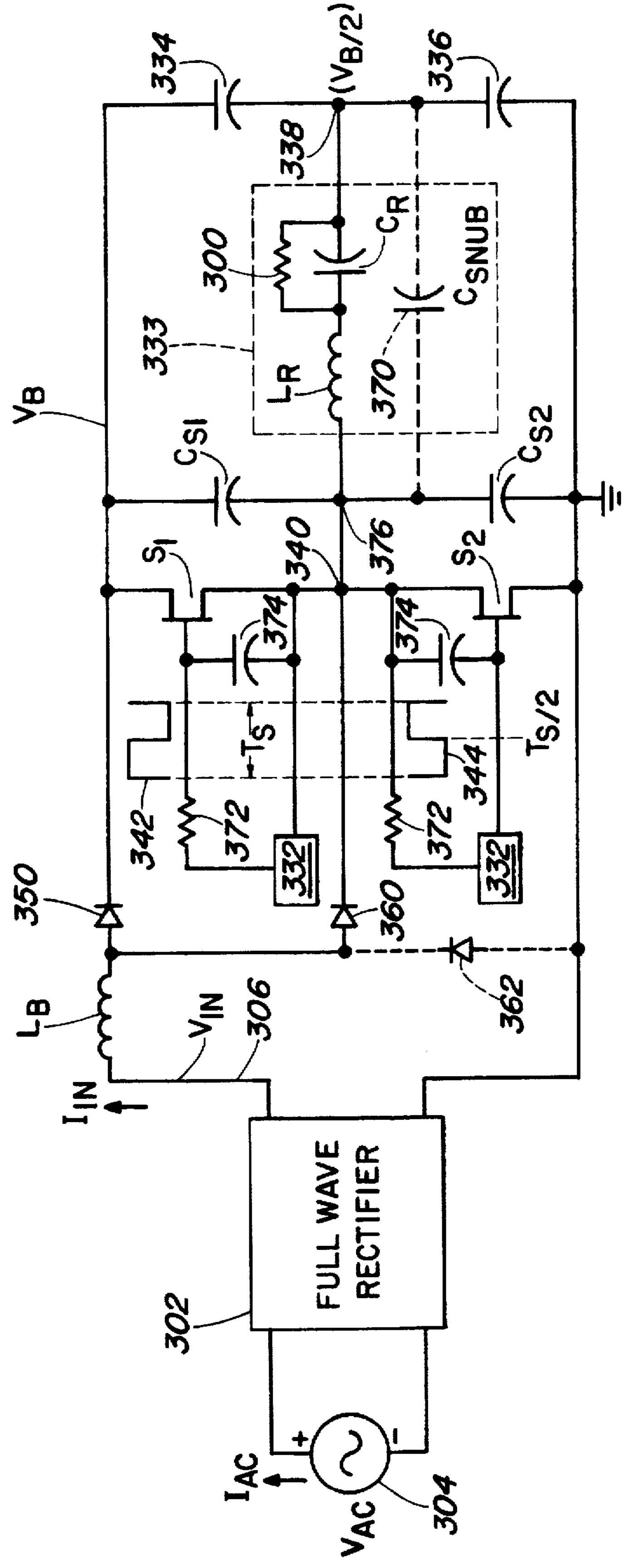
FIG. 3 is a simplified schematic of a condensed circuit for powering a circuit with bi-directional current and reducing bus voltage, in accordance with the present invention.

Referring now to FIG. 3, there is provided a power supply circuit in accordance with the present invention that realizes, in addition to the foregoing benefits of the prior art circuits of FIGS. 1 and 2, benefits including a controlled bus voltage.

In FIG. 3, parts similar to those described in connection with FIGS. 1 and 2 share like references numerals; only the first digit of the reference numeral, relating to figure number, is different.

In FIG. 3, during dead time, zero voltage switching is always applied. It is well known in the art that optimal switching is achieved when the set voltage is decreased to zero exactly within the full range of dead time. Consequently, the dead time is affected by slowing down the work accomplished during the dead time. Forcing the dead time to adhere to predetermined parameters allows bus voltage $V_B$ to be controlled.

In accordance with the present invention, therefore, existing snubber capacitor $C_{SNUB}$ 370 is sized, i.e., increased, to completely, but solely, fill the longer dead time, thereby facilitating zero voltage switching and providing optimal efficiency. If $C_{SNUB}$ is sized too small, the dead time will not be completely filled, and voltage will remain which is lossy, resulting in hard switching. Conversely, if $C_{SNUB}$ is sized too large, its energy will not completely dissipate over the dead time, leaving stored energy and resulting in parasitic oscillation. The present invention, therefore, resonates the voltage down to zero during the entire range of dead time. The snubber capacitance is increased to provide the desired transition of voltage across the switches.

During the dead time, when $S_1$ has been turned off, $C_{SNUB}$ picks up current for the inductor, discharges to zero, and then turns on $S_2$. As will be obvious to those skilled in the art, and as illustrated in FIG. 3, $C_{SNUB}$ may comprise any of several alternative embodiments. For example, $C_{SNUB}$ may comprise a pair of snubber capacitors, $C_{S1}$ and $C_{S2}$, connected across said first and second switches $S_1$ and $S_2$. Alternatively, $C_{SNUB}$ may comprise a single snubber capacitor 370, connected between the first and second switches and half-bridge capacitors 334 and 336.

Continuing with FIG. 3, an RC circuit means, comprising resistors 372, capacitors 374, and switching control circuit means 332, is added in the gate drive circuit to provide a switching control for alternately switching on the first and second switches. Assuming a constant current, then the dead time is actually increased as a result of the gate drive modification, which provides a delay time. That is, switch $S_1$ cannot turn on until switch $S_2$ has turned off, plus the delay time due to the RC has passed. Additionally, the gate drive to the power switches must also be modified so that there is no gate voltage applied to either switch while the voltage between the switches is changing state. Zero voltage switching means that there is no voltage drain to the source on the switches. The output voltage is reduced because the apparent duty cycle that the boost converter sees is no longer 50%.

It is known in the art that the transfer function of a boost converter running in continuous conduction mode is 1/(1−D), with a similar function for discontinuous mode, where D is the duty cycle. By reducing this value, the transfer function and the bus voltage are reduced.

Figure 4A:
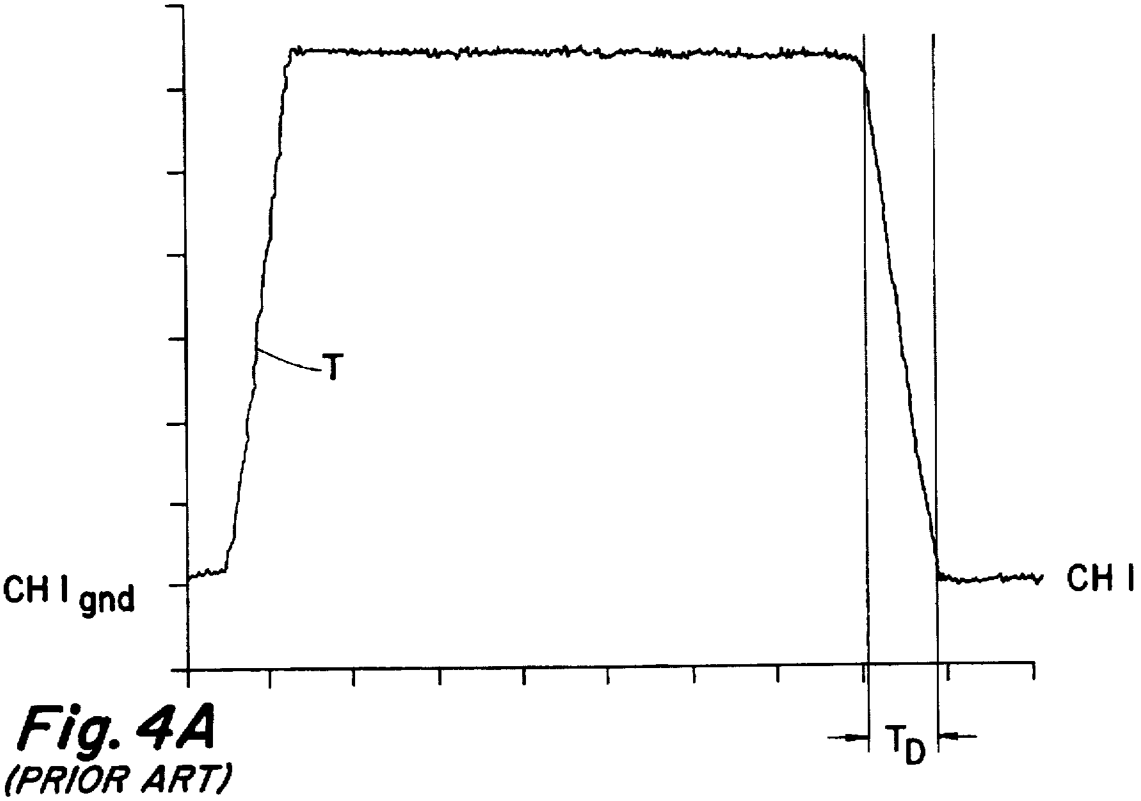
Fig. 4A (PRIOR ART)
FIGS. 4A and 4B illustrate a prior art waveform and a waveform in accordance with the present invention, respectively, for explaining the operation of the circuit of FIG. 3.
Figure 4B:
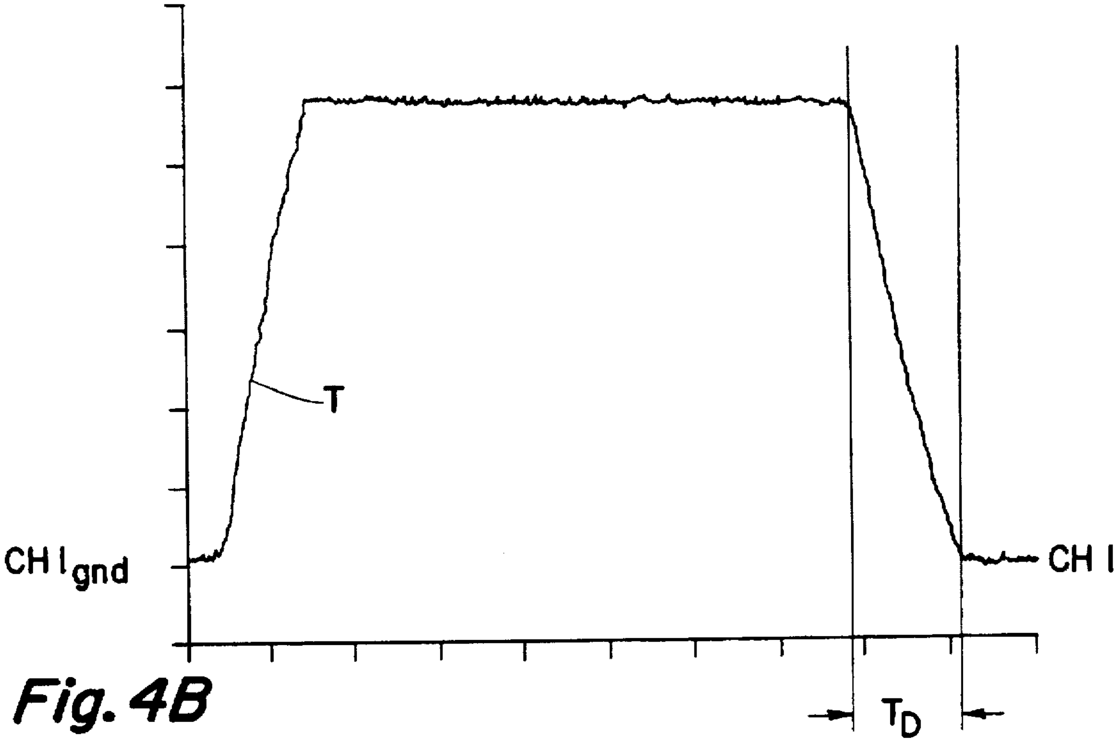

Referring now to FIG. 4A, there is illustrated a prior art waveform showing dead time, $T_D$. The increased dead time as a result of implementing the present invention, can therefore be seen in the waveform illustration of FIG. 4B. Assuming wave symmetry, the duty cycle can be calculated for the two cases illustrated in FIGS. 4A and 4B. Duty cycle, D, can be calculated according to the formula $$D=(T/2-T_D)/T \quad (3)$$

where T is a full period and $T_D$ is the dead time. In accordance with the present invention, bus voltage is controlled by manipulating the dead time, which is inherently related to duty cycle.

The invention has been described in detail with particular reference to certain preferred embodiments thereof, but it will be understood that modifications and variations can be effected within the spirit and scope of the invention.

What we claim as new and desire to secure by Letters Patent of the United States is:

1. A condensed power supply circuit for powering a gas discharge lamp with bi-directional current, the circuit comprising:

means for supplying d.c. power from an a.c. voltage;

a series half bridge converter for alternately impressing a d.c. bus voltage from a bus conductor across a load circuit first with one polarity and then with an opposite polarity relative to said one polarity, said series half bridge converter including:

a first switch interposed between said bus conductor and a first node to which said load circuit is coupled, a second switch interposed between a ground conductor and said first node, and a switching control circuit for alternately switching on said first and second switches;

a boost converter comprising:

a boost capacitor connected between said bus and ground conductors and whose level of charge determines the bus voltage on said bus conductor, a boost inductor for storing energy from said means for supplying d.c. power, said boost inductor being connected by a diode to said boost capacitor for discharging its energy into said boost capacitor, and means for periodically connecting a load end of said boost inductor through a low impedance path being connected by a diode to said ground conductor and thereby charging said boost inductor, said connecting means including a boost switch wherein said load end of said boost inductor is coupled to one terminal of said boost switch so that, in a first condition, said boost switch is effective so as to allow such charging of said boost inductor, and in a second condition, is effective so as to allow said boost inductor to discharge into said boost capacitor;

a resistor-capacitor delay circuit means associated with a gate to control dead time a period during which both first and second switches are off; and a snubber capacitor means for facilitating zero voltage switching to fill said entire dead time, said snubber capacitor means having a value set by said resistor-capacitor delay circuit means.

2. A condensed power supply circuit as claimed in claim 1 wherein said resistor-capacitor delay circuit means controls dead time by building a delay into transition of voltage across said first and second switches.

3. A condensed power supply circuit as claimed in claim 1 wherein said snubber capacitor means is interposed across said first and second switches.

4. A condensed power supply circuit as claimed in claim 1 wherein said snubber capacitor means is interposed between said first and second switches and first and second half-bridge capacitors.

5. A condensed power supply circuit as claimed in claim 1 wherein said boost switch comprises said second switch of said series half bridge converter.

6. A method for powering a gas discharge lamp with bi-directional current, the method comprising the steps of:

supplying d.c. power from an a.c. voltage;

providing a series half bridge converter for alternately impressing a d.c. bus voltage from a bus conductor across a load circuit first with one polarity and then with an opposite polarity relative to said one polarity, said series half bridge converter including:

a first switch interposed between said bus conductor and a first node to which said load circuit is coupled, a second switch interposed between a ground conductor and said first node, and a switching control circuit for alternately switching on said first and second switches;

providing a boost converter comprising:

a boost capacitor connected between said bus and ground conductors and whose level of charge determines the bus voltage on said bus conductor, a boost inductor for storing energy from said means for supplying d.c. power, said boost inductor being connected by a diode to said boost capacitor for discharging its energy into said boost capacitor, and means for periodically connecting a load end of said boost inductor through a low impedance path being connected by a diode to said ground conductor and thereby charging said boost inductor, said connecting means including a boost switch wherein said load end of said boost inductor is coupled to one terminal of said boost switch so that, in a first condition, said boost switch is effective so as to allow such charging of said boost inductor, and in a second condition, is effective so as to allow said boost inductor to discharge into said boost capacitor; and increasing a dead time a period during which first and second switches are off for reducing the bus voltage.

7. A method for powering a gas discharge lamp with bi-directional current as claimed in claim 6 wherein the step of increasing dead time further comprises the step of providing a resistor-capacitor delay circuit means associated with a gate to control said dead time.

8. A method for powering a gas discharge lamp with bi-directional current as claimed in claim 6 further comprising the step of using a snubber capacitor means to facilitate zero voltage switching to fill said entire dead time.

9. A method for powering a gas discharge lamp with bi-directional current as claimed in claim 7 further comprising the step of using said resistor-capacitor delay circuit means to set a value for said snubber capacitor means.

10. A method for powering a gas discharge lamp with bi-directional current as claimed in claim 8 wherein said snubber capacitor means is interposed across said first and second switches.

11. A method for powering a gas discharge lamp with bi-directional current as claimed in claim 8 wherein said snubber capacitor means is interposed between said first and second switches and first and second half-bridge capacitors.

12. A method for powering a gas discharge lamp with bi-directional current as claimed in claim 6 further comprising the step of building a delay into transition of voltage across said first and second switches.

13. A condensed power supply circuit as claimed in claim 1 wherein the dead time controls the bus voltage.

14. A method for powering a gas discharge lamp with bi-directional current as claimed in claim 6 wherein increasing the dead time reduces a duty cycle.

15. A condensed power supply circuit for powering a gas discharge lamp with bi-directional current, the circuit comprising:

means for supplying d.c. power from an a.c. voltage;

a series half bridge converter for alternately impressing a d.c. bus voltage from a bus conductor across a load circuit first with one polarity and then with an opposite polarity relative to said one polarity, said series half bridge converter including a first switch, a second switch and a switching control circuit for alternately switching on said first and second switches;

a boost converter comprising a boost capacitor connected between said bus conductor and a ground conductor and whose level of charge determines the bus voltage on said bus conductor; and a resistor-capacitor delay circuit for controlling a dead time, the dead time controlling the bus voltage, the first switch and the second switch being in an off state during the dead time.

16. A condensed power supply circuit as claimed in claim 15 wherein increasing the dead time reduces a duty cycle seen by the boost converter.

17. A condensed power supply circuit as claimed in claim 16 wherein reducing the duty cycle reduces the bus voltage.

18. A condensed power supply circuit as claimed in claim 15 wherein increasing the dead time reduces a duty cycle seen by the boost converter, thereby reducing the bus voltage.

* * * * *